United States Patent
Yoshimoto et al.

(10) Patent No.: US 7,022,754 B2
(45) Date of Patent: Apr. 4, 2006

(54) UNSATURATED POLYESTER RESIN COMPOSITION, CURED UNSATURATED POLYESTER RESIN AND LAMP REFLECTING MIRROR BASE

(75) Inventors: Yuji Yoshimoto, Shizuoka (JP); Hisayoshi Daicho, Shizuoka (JP); Hideki Tanaka, Shizuoka (JP); Hiroka Tanisake, Kanagawa (JP); Yasuo Usuda, Kanagawa (JP); Yuichi Tsuchiya, Kanagawa (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 324 days.

(21) Appl. No.: 10/274,969

(22) Filed: Oct. 22, 2002

(65) Prior Publication Data

US 2003/0083420 A1    May 1, 2003

(30) Foreign Application Priority Data

Oct. 23, 2001   (JP) .......................... P. 2001-324992

(51) Int. Cl.
    *C08K 3/40*   (2006.01)
    *C08K 3/10*   (2006.01)
    *C08L 67/06*  (2006.01)

(52) U.S. Cl. .................. 523/527; 523/513; 524/425; 524/493

(58) Field of Classification Search ................ 524/492, 524/493, 425; 523/513, 527
See application file for complete search history.

(56) References Cited

U.S. PATENT DOCUMENTS

| 4,623,562 | A | * | 11/1986 | Breitenfellner et al. ..... 427/296 |
| 4,683,266 | A | | 7/1987 | Palermo et al. |
| 5,047,455 | A | | 9/1991 | Hesse et al. |
| 5,985,465 | A | * | 11/1999 | Daichou et al. ............ 428/458 |

FOREIGN PATENT DOCUMENTS

| JP | 57-28442 | 6/1982 |
| JP | 9-97512 | 4/1997 |
| WO | WO 95/09201 A1 | 4/1995 |

* cited by examiner

*Primary Examiner*—Tae H. Yoon
(74) *Attorney, Agent, or Firm*—Sughrue Mion, PLLC

(57) ABSTRACT

An unsaturated polyester resin composition containing 8 to 20% by weight of unsaturated polyester resin, 4 to 12% by weight of liquid thermoplastic resin, 8 to 20% by weight of glass fiber, and 50 to 75% by weight of inorganic filler, the unsaturated polyester resin containing 5.10 to 5.90 mmol/g of double bond group concentration, 1.50 to 2.50 mmol/g of ether linkage group concentration, 1.05 to 1.30 mmol/g of isopropylidene linkage group concentration, 2.50 to 3.50 mmol/g of ethylene linkage group concentration, and 3.20 to 3.60 mmol/g of methylene linkage group concentration per 1 g of unsaturated polyester.

9 Claims, No Drawings

UNSATURATED POLYESTER RESIN COMPOSITION, CURED UNSATURATED POLYESTER RESIN AND LAMP REFLECTING MIRROR BASE

BACKGROUND OF THE INVENTION

1. Field of the Invention

The present invention relates to an unsaturated polyester resin composition and a cured resin thereof. Particularly, it relates to an unsaturated polyester resin composition and a cured resin thereof preferably used for molding a reflecting mirror base of a vehicle lamp such as a head lamp or a fog lamp mounted in an automobile, and relates to a lamp reflecting mirror base made of the cured resin.

2. Description of the Related Art

A thermoplastic resin such as an unsaturated polyester resin has been used widely in a field of home building materials such as wall materials, floor materials, bathtubs, dressing tables, tiles or artificial marble; a field of ships; a field of automobiles; or an electric and electronic field. A reflecting mirror of a lamp such as a head lamp or a fog lamp mounted in an automobile in the automobile field needs to endure high heat generated from a filament in use because a very high luminance electric bulb with the filament is used in combination with the reflecting mirror. Hence, a lamp reflecting mirror base is made of a thermoplastic resin composition excellent in heat resistance. For example, a composition for molding a lamp reflecting mirror has been disclosed in Japanese Patent Laid-Open No. 28442/1982. The disclosed composition is prepared in such a manner that a low-shrinkable unsaturated polyester resin composition containing 10 to 25% by weight of glass fiber, and 50 to 65% by weight of filler such as calcium carbonate is mixed with calcium stearate chemically bonded to the filler as a miscible internal lubricant and an aliphatic peroxy compound as a curing agent.

Although a lamp reflecting mirror, particularly a lamp reflecting mirror preferably used in a head lamp mounted in an automobile, needs to have heat resistance and strength to endure high heat (about 180° C.) generated at the time of switching on the lamp, a lamp reflecting mirror using the low-shrinkable unsaturated polyester resin composition disclosed in Japanese Patent Laid-Open No. 28442/1982 as a base material may be thermally deformed because of increase of heat in a lamp chamber at the time of switching on the lamp when the lamp reflecting mirror is used for a long time. It has been also found that both dimensional stability and surface smoothness are spoiled because the base material is shrunk by heat generated at the time of injection-molding the lamp reflecting mirror base.

As a result, a surface of the reflecting mirror is distorted. The distortion causes roughening of the reflecting mirror surface, so that light irradiated from the electric bulb cannot be controlled accurately. Hence, there is a problem that a light distribution standard cannot be satisfied or dazzling light may be given to a car coming from the opposite direction.

SUMMARY OF THE INVENTION

To solve the problem, a resin composition has been disclosed in Japanese Patent Laid-Open No. 97512/1997. The disclosed resin composition contains an unsaturated polyester resin having a glass transition point of not lower than 150° C., a thermoplastic resin having a glass transition point of not lower than 150° C., glass fiber, and an inorganic filler. Although heat resistance of a molded product obtained from the resin composition is improved compared with that of the related-art molded product, it cannot be said that the heat resistance is sufficient. In addition, the resin composition has a problem in molding cycle efficiency and cannot be always satisfied.

An object of the invention is to provide: an unsaturated polyester resin composition satisfying required performance of an automobile lamp reflecting mirror base and having excellent heat resistance, dimensional stability, surface smoothness and strength; a cured resin thereof, and a lamp reflecting mirror base made of the cured resin.

The present inventors have made diverse examinations to solve the problems. As a result, it has been found that the expected object can be achieved by an unsaturated polyester resin composition prepared in such a manner that glass fiber, an inorganic filler and a liquid thermoplastic resin are mixed with an unsaturated polyester resin prepared in such a manner that unsaturated polyester containing specific concentrations of specific chemical bond groups is dissolved in a polymerizable unsaturated monomer, and by a cured resin of the unsaturated polyester resin composition.

That is, (1) the invention relates to an unsaturated polyester resin composition containing 8 to 20% by weight of unsaturated polyester resin, 4 to 12% by weight of liquid thermoplastic resin, 8 to 20% by weight of glass fiber, and 50 to 75% by weight of inorganic filler.

(2) The invention further relates to an unsaturated polyester resin composition containing 8 to 20% by weight of unsaturated polyester resin, 4 to 12% by weight of liquid thermoplastic resin, 8 to 20% by weight of glass fiber, and 50 to 75% by weight of inorganic filler, the unsaturated polyester resin containing 5.10 to 5.90 mmol/g of double bond group concentration, 1.50 to 2.50 mmol/g of ether linkage group concentration, 1.05 to 1.30 mmol/g of isopropylidene linkage group concentration, 2.50 to 3.50 mmol/g of ethylene linkage group concentration, and 3.20 to 3.60 mmol/g of methylene linkage group concentration per 1 g of unsaturated polyester.

(3) The invention relates to an unsaturated polyester resin composition as in (1) or (2), wherein the unsaturated polyester resin is prepared in a manner so that 65 to 75% by weight of unsaturated polyester obtained by polycondensation of a polyvalent alcohol component and one of α,β-unsaturated dibasic acid and anhydride thereof is dissolved in 25 to 35% by weight of polymerizable unsaturated monomer, the polyvalent alcohol component containing at least one member selected from the group consisting of ethylene glycol, diethylene glycol, propylene glycol, dipropylene glycol, and neopentyl glycol.

(4) The invention relates to an unsaturated polyester resin composition as in any one of (1) through (3), wherein ethylene glycol, dipropylene glycol and neopentyl glycol are essential as the polyvalent alcohol component.

(5) The invention relates to an unsaturated polyester resin composition as in any one of (1) through (4), wherein the liquid thermoplastic resin is a liquid resin prepared in a manner so that 30 to 45% by weight of at least one resin selected from the group consisting of acrylic-based resin, vinyl acetate-based resin, saturated polyester resin and thermoplastic urethane resin and having a glass transition point of not higher than 150° C. is dissolved in 55 to 70% by weight of polymerizable unsaturated monomer.

(6) The invention relates to an unsaturated polyester resin composition as in any one of (1) through (5), wherein the polymerizable unsaturated monomer is a styrene-based monomer.

(7) The invention relates to an unsaturated polyester resin composition as in any one of (1) through (6), wherein the inorganic filler is calcium carbonate having a mean particle size of from 0.2 to 20 μm.

(8) The invention relates to an unsaturated polyester resin composition as in any one of (1) through (6), wherein the glass fiber has a fiber size of from 6 to 18 μm and a fiber length of from 1 to 20 mm.

(9) Further, the invention relates to a cured unsaturated polyester resin obtained by curing of an unsaturated polyester resin composition defined in any one of (1) through (8), wherein: the cured unsaturated polyester resin has a 60°-angular gloss of not lower than 88% and a glass transition point of not lower than 180° C.; and a weight loss of the cured unsaturated polyester resin on heating is not larger than 1.5% when the cured unsaturated polyester resin is heated at 200° C. for 200 hours.

(10) The invention relates to a cured unsaturated polyester resin obtained by curing of an unsaturated polyester resin composition defined in any one of (1) through (8), wherein the cured unsaturated polyester resin has a tensile strength of not smaller than 20 MPa, a bending strength of not smaller than 40 MPa and an Izod impact strength of not smaller than 40 μm.

(11) The invention further relates to a lamp reflecting mirror base made of a cured unsaturated polyester resin obtained by curing of an unsaturated polyester resin composition defined in any one of (1) through (10).

DESCRIPTION OF THE PREFERRED EMBODIMENTS

The invention relates to an unsaturated polyester resin composition excellent in heat resistance, dimensional stability, surface smoothness and mechanical strength. Specifically, it relates to an unsaturated polyester resin composition containing 8 to 20% by weight of unsaturated polyester resin, 4 to 12% by weight of liquid thermoplastic resin, 8 to 20% by weight of glass fiber, and 50 to 75% by weight of inorganic filler, and a lamp reflecting mirror base made of a cured resin obtained by curing of the unsaturated polyester resin composition. The unsaturated polyester resin composition according to the invention is particularly preferably used for molding an automobile lamp reflecting mirror base. The invention will be described below on a resin composition for molding an automobile lamp reflecting mirror base.

In the invention, the unsaturated polyester resin is a liquid resin prepared in such a manner that a polymerizable unsaturated monomer is mixed with unsaturated polyester obtained by polycondensation of polyvalent alcohol and either of $\alpha,\beta$-unsaturated dibasic acid and anhydride thereof. That is, the unsaturated polyester resin contains 65 to 75% by weight of unsaturated polyester, and 32 to 25% by weight of polymerizable unsaturated monomer.

When an unsaturated polyester resin prepared in such a manner that unsaturated polyester obtained by polycondensation of polyvalent alcohol and $\alpha,\beta$-unsaturated dibasic acid such as maleic acid or maleic anhydride is dissolved in a styrene monomer is cured under the presence of an organic peroxide-based curing agent, it is generally known that the chemical, thermal and mechanical properties of the cured resin vary according to the kind of the polyvalent alcohol used.

For example, unsaturated polyester obtained by polycondensation of maleic anhydride and propylene glycol is excellent in miscibility to a styrene monomer, so that a cured resin obtained from an unsaturated polyester resin dissolved in a styrene monomer is also relatively good in balance of physical properties. The cured resin is however inferior in impact resistance because the cured resin is apt to be rigid and fragile.

When ethylene glycol is used as the polyvalent alcohol, good impact resistance is obtained but the obtained unsaturated polyester is inferior in miscibility to a styrene monomer. Therefore, ethylene glycol is generally used in combination with some other polyvalent alcohol. When diethylene glycol is used, good flexibility and good crack resistance can be obtained but there is a disadvantage in poor heat resistance. When dipropylene glycol is used, a cured resin having toughness can be obtained but there is a disadvantage in poor heat resistance. When neopentyl glycol is used, a cured resin excellent in pigment dispersibility and good in water resistance, chemical resistance and weather resistance can be obtained but the cured resin is relatively expensive.

An object of the invention is to provide an unsaturated polyester resin composition excellent in heat resistance, dimensional stability, surface smoothness and mechanical strength. In the invention, an unsaturated polyester resin is used in the condition that specific ranges of bond group concentrations exist in unsaturated polyester obtained by polycondensation of at least one kind of $\alpha,\beta$-unsaturated dibasic acid or anhydride thereof selected from the group consisting of maleic acid, maleic anhydride, fumaric acid, itaconic acid and citraconic acid and at least one kind of polyvalent alcohol selected from the group consisting of ethylene glycol, propylene glycol, neopentyl glycol, diethylene glycol and dipropylene glycol.

That is, the unsaturated polyester resin used in the invention contains 5.10 to 5.90 mmol/g of double bond group concentration, 1.50 to 2.50 mmol/g of ether linkage group concentration, 1.05 to 1.30 mmol/g of isopropylidene linkage group concentration, 2.50 to 3.50 mmol/g of ethylene linkage group concentration, and 3.20 to 3.60 mmol/g of methylene linkage group concentration per 1 g of unsaturated polyester. Hence, the cured resin obtained from the unsaturated polyester resin composition according to the invention can satisfy target characteristics and physical properties.

In the invention, at least one member selected from the group consisting of maleic acid, maleic anhydride, fumaric acid, itaconic acid and citraconic acid is used as the $\alpha,\beta$-unsaturated dibasic acid or anhydride thereof. Particularly, maleic acid or maleic anhydride is preferably used. As occasion demands, phthalic acid or phthalic anhydride, isophthalic acid, terephthalic acid, tetrahydrophthalic acid, tetrahydrophthalic anhydride, adipic acid, sebacic acid, etc. may be used as saturated dibasic acid or anhydride thereof. At least one kind of saturated dibasic acid or anhydride thereof may be mixed with the $\alpha,\beta$-unsaturated dibasic acid or anhydride thereof for use.

In the invention, the $\alpha,\beta$-unsaturated dibasic acid or anhydride thereof has 1 mol of double bond group per one molecule. Hence, the usage amount of the $\alpha,\beta$-unsaturated dibasic acid or anhydride thereof is decided in a range satisfying the double bond group concentration existing in 1 g of unsaturated polyester in the invention and in consideration of the relation to the other components.

Examples of the polyvalent alcohol used in the invention may include ethylene glycol, diethylene glycol, propylene glycol, dipropylene glycol, and neopentyl glycol. One kind of polyvalent alcohol may be used, or two or more kinds of polyvalent alcohol may be mixed for use. In the invention, it is particularly preferable from the point of view of desired characteristics that three kinds of polyvalent alcohol, that is, ethylene glycol, dipropylene glycol and neopentyl glycol are used essential components.

Besides these kinds of polyvalent alcohol, at least one member selected from 1,3-propanediol, 1,3-butanediol, 1,4-butanediol, 1,6-hexanediol, 1,4-cyclohexanedimethanol and hydrogenated bisphenol A may be mixed with the polyvalent alcohol for use, as occasion demands.

In the polyvalent alcohol, ethylene glycol has 1 mol of ether linkage group per one molecule, propylene glycol has 1 mol of methylene linkage group per one molecule, neopentyl glycol has 1 mol of isopropylidene linkage group per one molecule, diethylene glycol has 1 mol of ethylene linkage group and 1 mol of ether linkage group per one molecule, and dipropylene glycol has 1 mol of methylene linkage group and 1 mol of ether linkage group per one molecule. Hence, the usage amount of each of these kinds of polyvalent alcohol is decided in a range satisfying the bond group concentration existing in 1 g of unsaturated polyester in the invention and in consideration of the relation to the other components.

Examples of the polymerizable unsaturated monomer with double bonds used in the invention include styrene monomer, vinyl toluene, divinyl benzene, p-methyl styrene, methyl methacrylate, diallyl phthalate, and diallyl isophthalate. One polymerizable unsaturated monomer may be used, or two or more polymerizable unsaturated monomers selected from these polymerizable unsaturated monomers may be mixed for use. Generally, all required amounts of these polymerizable unsaturated monomers are mixed with unsaturated polyester in advance so as to be contained in the unsaturated polyester resin. These polymerizable unsaturated monomers may be partially added at the time of preparing the unsaturated polyester resin composition so that a desired resin composition can be provided.

The unsaturated polyester resin is prepared in such a manner that a predetermined amount of the unsaturated polyester and a predetermined amount of the polymerizable unsaturated monomer are mixed to be mutually dissolved or mutually mixed. On this occasion, a polymerization inhibitor is generally added for the double purpose of preparing the unsaturated polyester resin stably without gelation and obtaining storage stability of the prepared unsaturated polyester resin. Examples of the polymerization inhibitor include polyvalent phenol-based polymerization inhibitors such as hydroquinone, parabenzoquinone, methylhydroquinone or trimethylhydroquinone. In the resin composition according to the invention, 0.02 to 0.5% by weight of these polymerization inhibitors are generally used, preferably 0.05 to 0.15% by weight of these polymerization inhibitors are used. All the amount of the polymerization inhibitor may be mixed with the unsaturated polyester resin in advance, or as occasion demands, the predetermined amount of the polymerization inhibitor may be partially mixed with the liquid thermoplastic resin which is one of constituent components of the resin composition according the invention. Alternatively, the polymerization inhibitor may be partially added at the time of preparing the unsaturated polyester resin composition so that a desired resin composition can be provided.

A curing agent is used in the unsaturated polyester resin composition according to the invention. Generally, organic peroxide is preferably used as the curing agent. Examples of the curing agent include t-butyl peroxybenzoate, t-butyl peroxy-2-ethylhexanoate, t-butyl peroxyisopropylcarbonate, and 1,1-bis(t-butyl peroxy)3,3,5-trimethylcyclohexane. In the resin composition according to the invention, 0.2 to 5% by weight of these curing agents are preferably used, and 0.2 to 3.0% by weight of these curing agents are more preferably used.

A liquid thermoplastic resin is added into the unsaturated polyester resin composition according to the invention in order to suppress shrinkage at the time of curing. The liquid thermoplastic resin is prepared in such a manner that 30 to 45% by weight of thermoplastic resin are dissolved in 55 to 70% by weight of polymerizable monomer having some polymerizable double bond in one molecule. Examples of the thermoplastic resin may include styrene-based copolymer, polyethylene, polyvinyl acetate-based polymer, polyvinyl chloride-based polymer, polymethyl methacrylate, polymethyl methacrylate copolymer, ABS resin, denatured ABS resin, polycaprolactone, denatured polyurethane, and saturated polyester resin. Among them, polymethyl methacrylate, polymethyl methacrylate copolymer, polyvinyl acetate, styrene-vinyl acetate copolymer, thermoplastic urethane, and saturated polyester resin are particularly preferably used from the point of view of dispersibility, low shrinkability and rigidity. In the resin composition according to the invention, 4 to 12% by weight of the liquid thermoplastic resin are mixed, preferably 6 to 10% by weight of the liquid thermoplastic resin are mixed.

The liquid thermoplastic resin used in the invention has the property of producing thermal expansion by heat generated at the time of curing of the unsaturated polyester resin. To sufficiently fulfill the property, it is preferable that the liquid thermoplastic resin has a glass transition point of not higher than 150° C., particularly in a range of from 120° C. to −10° C. When the glass transition point is not higher than 150° C., sufficient thermal expansion of the thermoplastic resin is obtained at the time of molding. Hence, shrinkage on curing of the unsaturated polyester resin can be sufficiently suppressed, so that a cured resin excellent in dimensional stability and surface smoothness can be obtained. Hence, a lamp reflecting mirror base excellent in dimensional stability and surface smoothness can be obtained from the unsaturated polyester resin composition according to the invention.

Glass fiber as a reinforcing material is further mixed with the unsaturated polyester resin composition according to the invention. The glass fiber used has a fiber size of from 6 to 18 μm and a fiber length of 1 to 20 mm, preferably has a fiber size of from 10 to 16 μm and a fiber length of 3 to 15 mm. The resin composition according to the invention contains 8 to 20% by weight of the glass fiber, preferably 10 to 18% by weight of the glass fiber. When the content of the glass fiber is larger than the upper limit of the range, the fluidity of the resin composition at the time of molding is lowered and the surface of the molded product is roughened undesirably. When the content of the glass fiber is contrariwise smaller than the lower limit of the range, required strength cannot be obtained undesirably. When a lamp reflecting mirror base is molded from the unsaturated polyester resin composition containing glass fiber in the range according to the invention, the lamp reflecting mirror base excellent in surface smoothness and mechanical strength and having sufficient impact strength can be obtained.

An inorganic filler is mixed with the unsaturated polyester resin composition according to the invention. Examples of the inorganic filler include calcium carbonate, mica, talc, graphite, carbon black, asbestos, and aluminum hydroxide. Among them, calcium carbonate particularly having a mean particle size of from 0.2 to 20 μm, preferably from 1 to 10 μm is preferably used. Preferably, 50 to 75% by weight of the calcium carbonate, particularly 55 to 70% by weight of the calcium carbonate is mixed with the resin composition according to the invention. If the amount of the inorganic filler is larger than the upper limit of the range, fluidity at the time of molding is lowered undesirably. If the amount of the inorganic filler is smaller than the lower limit of the range, required physical properties cannot be obtained.

An internal releasant for releasing a molded product from a mold easily may be preferably added to the unsaturated polyester resin composition according to the invention. Aliphatic metal salt such as zinc stearate, magnesium stearate, calcium stearate or aluminum stearate can be used as the internal releasant. Particularly, stearate is preferably used. The amount of the internal releasant added is preferably selected to be in a range of from 0.5 to 5.0% by weight, more preferably in a range of from 0.4 to 4.0% by weight. Hence, stable release can be made at the time of molding without occurrence of any crack in the molded product. If the amount of the internal releasant is smaller than the lower limit of the range, releasability is poor. If the amount of the internal releasant is larger than the upper limit of the range, surface coating characteristic and adhesion to the cured resin are lowered. When a lamp reflecting mirror base is molded from the unsaturated polyester resin composition containing the internal releasant in the range, a required surface treatment (primer treatment) for a reflecting surface of a lamp reflecting mirror can be performed easily. Hence, leveling of coating and adhesion can be ensured sufficiently.

Further, as occasion demands, a small amount of pigment and a small amount of viscosity bodying agent such as magnesium oxide or calcium oxide may be mixed with the unsaturated polyester resin composition according to the invention.

The cured resin obtained from the unsaturated polyester resin composition according to the invention can satisfy the requirements of the lamp reflecting mirror base, that is, a 60°-angular gloss of not smaller than 88, a glass transition point of not lower than 180° C., a weight loss of not larger than 1.5% on heating at 200° C. for 200 hours, a tensile strength of not lower than 20 MPa, a bending strength of not lower than 40 MPa and an Izod impact strength of not lower than 40 J/m.

An example of molding of a lamp reflecting mirror base out of an unsaturated polyester resin composition according to the invention will be described. That is, an unsaturated polyester resin composition containing 8 to 20% by weight of unsaturated polyester resin, 4 to 12% by weight of liquid thermoplastic resin, 8 to 20% by weight of glass fiber, 50 to 75% by weight of inorganic filler, 0.2 to 5% by weight of curing agent, 0.4 to 5% by weight of internal releasant, and 0.02 to 0.3% by weight of viscosity bodying agent is injected into a mold of a suitable shape for molding a lamp reflecting mirror base, preferably by injection molding or injection-compression molding. Then, the unsaturated polyester resin composition is heated and cured to thereby mold a lamp reflecting mirror base. On this occasion, in order to decompress a space portion in a cavity of the mold before injection, a tank connected to a vacuum source is preferably connected to the mold so that air in the cavity is removed before injection. For curing, the mold is preferably heated at a temperature of from 130° C. to 180° C., more preferably from 140° C. to 160° C. The curing time is set suitably according to the thickness of the aimed lamp reflecting mirror base. Generally, the curing time is preferably selected to be in a range of from about 0.3 to 4 minutes. Thermal shrinkage at the time of curing is little observed. The surface state of the lamp reflecting mirror base released from the mold is very good. The lamp reflecting mirror base has little distortion and has a high gloss.

Then, when a surface of the reflecting mirror base is coated with a film of a metal such as aluminum, a primer as an undercoat is preferably applied to thereby activate the surface. As occasion demands, at least one kind of lacquer may be applied on the primer coat. Then, a film of a metal such as aluminum is formed thereon by a vacuum vapor deposition or sputtering method to thereby form a reflecting mirror surface. Incidentally, a material having the property of bonding the reflecting mirror surface and the reflective aluminum film to each other is used as the lacquer. For example, polyester, polybutadiene, epoxy, acryl or alkyd resin can be preferably used as the lacquer. As occasion demands, a protective film of lacquer may be further provided on the metal film.

EXAMPLE

The invention will be described below more specifically in accordance with the following example. In this example, the physical properties of the cured resin were measured as follows.

The glass transition point (Tg) was calculated on the basis of the peak value of dynamic viscoelastic modulus (tan δ) of the cured resin. The dynamic viscoelastic modulus of the cured resin was measured with a RHEOVIBRON DDV-25FP made by ORIENTEC CORP., in the condition of a heating rate of 2° C./min, a tensile load of 100 gf, a vibration frequency of 10 Hz and a vibration amplitude of 25 μm (Dynamic viscoelastic method).

The surface gloss was measured as 60°-angular gloss with a specular gloss meter in accordance with JIS Z 8741 (1983).

The tensile strength was measured in accordance with JIS K 6911 (1995) 5-18-1.

The bending strength was measured in accordance with JIS K 6911 (1995) 5-17-1.

The Izod impact strength was measured in accordance with JIS K 6911 (1995) 5-20.

The shrinkage factor was measured in accordance with JIS K 6911 (1995) 5-7.

A (rib-including) test piece having a size of 100 mm×100 mm was used for obtaining the weight loss on heating. An oven was used as a heater.

The test piece was dried at a temperature of from 100 to 120° C. for 1 hour to remove water from a surface of the test piece. After the test piece was dried, the initial weight of the test piece was measured at room temperature (25° C.). Then, the test piece was put into the oven pre-heated at 200° C. and heated at 200° C. for 200 hours. Then, the test piece was taken out from the oven and left at room temperature. Then, the weight of the test piece after heating was measured at 25° C. The weight of the test piece after heating was subtracted from the initial weight to thereby calculate the weight loss (%) on heating.

EXAMPLE (1) Synthesis of Unsaturated Polyester Resin

Synthesis Example 1

In a partial circulator-including reactor having a stirrer, a thermometer, a nitrogen gas feeding pipe and a column top thermometer, 980.6 g (10 mol) of maleic anhydride, 229.1 g (2.2 mol) of neopentyl glycol, 322.8 g (5.2 mol) of ethylene glycol and 415.9 g (3.1 mol) of dipropylene glycol were put and heated to 205° C. under a nitrogen gas stream to perform a polycondensation reaction by a single-step process according to an ordinary method to thereby obtain unsaturated polyester (a) having an acid value of 12. In 777 g of styrene monomer containing 0.63 g of hydroquinone dissolved therein, 1730 g of the unsaturated polyester (a) were dissolved to obtain 2507 g of unsaturated polyester resin (A).

Synthesis Example 2

In a reactor similar to that in Synthesis Example 1, 980.6 g (10 mol) of maleic anhydride, 229.1 g (2.2 mol) of neopentyl glycol, 15.2 g (0.19 mol) of propylene glycol, 335.2 g (5.4 mol) of ethylene glycol and 362.3 g (2.7 mol) of dipropylene glycol were put and heated to 205° C. under a nitrogen gas stream to perform a polycondensation reaction by a single-step process according to an ordinary method to thereby obtain unsaturated polyester (b) having an acid value of 14. In 768 g of styrene monomer containing 0.62 g of hydroquinone dissolved therein, 1708 g of the unsaturated polyester (b) were dissolved to obtain 2476 g of unsaturated polyester resin (B).

Synthesis Example 3

In a reactor similar to that in Synthesis Example 1, 980.6 g (10 mol) of maleic anhydride, 197.9 g (1.9 mol) of neopentyl glycol, 45.7 g (0.6 mol) of propylene glycol, 335.2 g (5.4 mol) of ethylene glycol and 348.8 g (2.6 mol) of dipropylene glycol were put and heated to 205° C. under a nitrogen gas stream to perform a polycondensation reaction by a single-step process according to an ordinary method to thereby obtain unsaturated polyester (c) having an acid value of 13. In 761 g of styrene monomer containing 0.62 g of hydroquinone dissolved therein, 1694 g of the unsaturated polyester (c) were dissolved to obtain 2455 g of unsaturated polyester resin (C).

Synthesis Example 4

In a reactor similar to that in Synthesis Example 1, 980.6 g (10 mol) of maleic anhydride, 197.9 g (1.9 mol) of neopentyl glycol, 30.4 g (0.4 mol) of propylene glycol, 322.8 g (5.2 mol) of ethylene glycol, 42.4 g (0.4 mol) of diethylene glycol and 348.8 g (2.6 mol) of dipropylene glycol were put and heated to 205° C. under a nitrogen gas stream to perform a polycondensation reaction by a single-step process according to an ordinary method to thereby obtain unsaturated polyester (d) having an acid value of 11. In 768 g of styrene monomer containing 0.62 g of hydroquinone dissolved therein, 1708 g of the unsaturated polyester (d) were dissolved to obtain 2476 g of unsaturated polyester resin (D).

Comparative Example 1

In a reactor similar to that in Synthesis Example 1, 980.6 g (10 mol) of maleic anhydride, 316.6 g (5.1 mol) of ethylene glycol and 724.5 g (5.4 mol) of dipropylene glycol were put and heated to 205° C. under a nitrogen gas stream to perform a polycondensation reaction by a single-step process according to an ordinary method to thereby obtain unsaturated polyester (e) having an acid value of 12. In 811 g of styrene monomer containing 0.66 g of hydroquinone dissolved therein, 1805 g of the unsaturated polyester (e) were dissolved to obtain 2616 g of unsaturated polyester resin (E).

Comparative Example 2

In a reactor similar to that in Synthesis Example 1, 980.6 g (10 mol) of maleic anhydride, 197.9 g (1.9 mol) of neopentyl glycol, 161.4 g (2.6 mol) of ethylene glycol and 805.0 g (6 mol) of dipropylene glycol were put and heated to 205° C. under a nitrogen gas stream to perform a polycondensation reaction by a single-step process according to an ordinary method to thereby obtain unsaturated polyester (f) having an acid value of 11. In 865 g of styrene monomer containing 0.70 g of hydroquinone dissolved therein, 1925 g of the unsaturated polyester (f) were dissolved to obtain 2790 g of unsaturated polyester resin (F).

Comparative Example 3

In a reactor similar to that in Synthesis Example 1, 148.1 g (1 mol) of phthalic anhydride, 882.5 g (9.0 mol) of maleic anhydride, 494.6 g (6.5 mol) of propylene glycol, 62.1 g (1 mol) of ethylene glycol, and 318.4 g (3 mol) of diethylene glycol were put and heated to 205° C. under a nitrogen gas stream to perform a polycondensation reaction by a single-step process according to an ordinary method to thereby obtain unsaturated polyester (g) having an acid value of 14. In 760 g of styrene monomer containing 0.62 g of hydroquinone dissolved therein, 1690 g of the unsaturated polyester (g) were dissolved to obtain 2450 g of unsaturated polyester resin (G).

Comparative Example 4

In a reactor similar to that in Synthesis Example 1, 222.2 g (1.5 mol) of phthalic anhydride, 833.5 g (8.5 mol) of maleic anhydride, 494.6 g (6.5 mol) of propylene glycol, 62.1 g (1 mol) of ethylene glycol, and 318.4 g (3 mol) of diethylene glycol were put and heated to 205° C. under a nitrogen gas stream to perform a polycondensation reaction by a single-step process according to an ordinary method to thereby obtain unsaturated polyester (h) having an acid value of 13. In 771 g of styrene monomer containing 0.62 g of hydroquinone dissolved therein, 1716 g of the unsaturated polyester (h) were dissolved to obtain 2487 g of unsaturated polyester resin (H).

Bond group concentrations per 1 g of unsaturated polyester obtained in each of Synthesis Examples 1 to 4 and Comparative Examples 1 to 4 are shown in Table 1. As is obvious from Table 1, in each of unsaturated polyester (a) to (d) obtained in Synthesis Examples 1 to 4, the double bond group concentration, the ether linkage group concentration, the ethylene linkage group concentration, the isopropylidene linkage group concentration and the methylene linkage group concentration satisfy the respective ranges defined in the invention. In unsaturated polyester (e) to (h) obtained in Comparative Examples 1 to 4, any one of the bond group requirements defined in the invention cannot be satisfied. That is, in unsaturated polyester (e), the ether linkage group concentration, the isopropylidene linkage group concentration and the methylene linkage group concentration cannot satisfy the respective concentrations defined in the invention. In unsaturated polyester (f), the double bond group concentration, the ether linkage group concentration, the ethylene linkage group concentration, the isopropylidene linkage group concentration and the methylene linkage group concentration cannot satisfy the respective concentrations defined in the invention. In unsaturated polyester (g), the ethylene linkage group concentration, the isopropylidene linkage group concentration and the methylene linkage group concentration cannot satisfy the respective concentrations defined in the invention. In unsaturated polyester (h), the double bond group concentration, the ether linkage group concentration, the ethylene linkage group concentration, the isopropylidene linkage group concentration and the methylene linkage group concentration cannot satisfy the respective concentrations defined in the invention.

(2) Preparation of Resin Composition and Physical Properties of Resin Composition Each of unsaturated polyester resins (A) to (H) obtained in Synthesis Examples 1 to 4 and Comparative Examples 1 to 4 was used for preparing a resin composition as follows. The physical properties of a cured resin obtained by curing of the resin composition were measured.

In a kneader, 1170 g of each of unsaturated polyester resins (A) to (H) obtained in Synthesis Examples 1 to 4 and Comparative Examples 1 to 4, 780 g of liquid thermoplastic resin (mixture of 40% by weight of polymethyl methacrylate-based resin and 60% by weight of styrene monomer) with number-average molecular weight of 35,000, 100 g of internal releasant (zinc stearate), 5 g of viscosity bodying agent (magnesium oxide), 40 g of curing agent (t-butyl peroxybenzoate), 5850 g of inorganic filler (calcium carbonate with a mean particle size of 5 μm) and 1650 g of glass fiber (with a fiber size of 13 μm and a fiber length of 6 mm) were dispersively mixed to thereby prepare an unsaturated polyester resin composition. After left for 24 hours in a room kept at 25° C., the prepared resin composition was thermally cured at 140° C. for 50 seconds by an injection molding method to thereby obtain a cured resin. Table 1 shows the physical properties of the cured resin.

TABLE 1

|  | Synthesis Example 1 | Synthesis Example 2 | Synthesis Example 3 | Synthesis Example 4 |
|---|---|---|---|---|
| Unsaturated polyester Bond group concentration (mmol/g) | (a) | (b) | (c) | (d) |
| Double bond group | 5.655 | 5.793 | 5.787 | 5.737 |
| Ether linkage group | 1.753 | 1.550 | 1.504 | 1.721 |
| Ethylene linkage group | 2.940 | 3.099 | 3.125 | 3.442 |
| Isopropylidene linkage group | 1.244 | 1.263 | 1.099 | 1.090 |
| Methylene linkage group | 3.506 | 3.214 | 3.356 | 3.213 |
| Physical properties of cured resin |  |  |  |  |
| Unsaturated polyester resin | A | B | C | D |
| Mold shrinkage (%) | 0.07 | 0.06 | 0.06 | 0.07 |
| Glass transition point (° C.) | 205 | 214 | 210 | 208 |
| 60°-angular gloss (%) | 93 | 94 | 94 | 94 |
| Tensile strength (MPa) | 44.1 | 45.2 | 45.1 | 45.4 |
| Bending strength (MPa) | 77.4 | 79.1 | 79.3 | 79.3 |
| Bending elastic modulus (MPa) | 14.0 | 14.5 | 14.2 | 14.0 |
| Izod impact strength (J/m) | 88.2 | 85.2 | 85.1 | 88.0 |
| Weight loss on heating (%) | 1.23 | 1.19 | 1.22 | 1.22 |

|  | Comparative Example 1 | Comparative Example 2 | Comparative Example 3 | Comparative Example 4 |
|---|---|---|---|---|
| Unsaturated polyester Bond group concentration (mmol/g) | (e) | (f) | (g) | (h) |
| Double bond group | 5.430 | 5.089 | 5.215 | 4.855 |
| Ether linkage group | 2.932 | 3.054 | 1.738 | 1.714 |
| Ethylene linkage group | 2.769 | 1.323 | 4.056 | 3.998 |
| Isopropylidene linkage group | 0.000 | 0.967 | 0.000 | 0.000 |
| Methylene linkage group | 5.864 | 6.107 | 3.767 | 3.713 |
| Physical properties of cured resin |  |  |  |  |
| Unsaturated polyester resin | E | F | G | H |
| Mold shrinkage (%) | 0.119 | 0.156 | 0.143 | 0.178 |
| Glass transition point (° C.) | 195 | 183 | 185 | 175 |
| 60°-angular gloss (%) | 81 | 70 | 72 | 30 |
| Tensile strength (MPa) | 42.1 | 39.5 | 36.3 | 38.1 |
| Bending strength (Mpa) | 78.4 | 73.6 | 74.5 | 71.5 |
| Bending elastic modulus (MPa) | 13.5 | 13.5 | 13.4 | 13.8 |
| Izod impact strength (J/m) | 65.7 | 69.3 | 70.6 | 71.3 |
| Weight loss on heating (%) | 2.44 | 2.70 | 2.65 | 2.90 |

The unsaturated polyester resin composition according to the invention can be used for obtaining a cured resin excellent in heat resistance, dimensional stability, surface smoothness and mechanical strength. The unsaturated polyester resin composition according to the invention is preferably used as a material for molding a lamp reflecting mirror base. Required performance of the lamp reflecting mirror base for vehicle can be ensured.

What is claimed is:

1. An unsaturated polyester resin composition comprising unsaturated polyester resin in an amount of 8 to 20% by weight; liquid thermoplastic resin in an amount of 4 to 12% by weight; glass fiber in an amount of 8 to 20% by weight; and inorganic filler in an amount of 50 to 75% by weight,
    wherein said unsaturated polyester resin is comprised of unsaturated polyester in an amount of 65 to 75% by weight, which is obtained by polycondensation of a polyvalent alcohol component and one of α,β-unsaturated dibasic acid and anhydride thereof, said unsaturated polyester being dissolved by polymerizable unsaturated monomer in an amount of 25 to 35% by weight, and
    wherein said polyvalent alcohol component containing at least three members selected from the group consisting of ethylene glycol, diethylene glycol, propylene glycol, dipropylene glycol, and neopentyl glycol so that said unsaturated polyester resin comprises 5.10 to 5.90 mmol/g of double bond group concentration, 1.50 to 2.50 mmol/g of ether linkage group concentration, 1.05 to 1.30 mmol/g of isopropylidene linkage group concentration, 2.50 to 3.50 mmol/g of ethylene linkage group concentration, and 3.20 to 3.60 mmol/g of methylene linkage group concentration per 1 g of unsaturated polyester.

2. The unsaturated polyester resin composition according to claim 1, wherein ethylene glycol, dipropylene glycol and neopentyl glycol are essential as said polyvalent alcohol component.

3. The unsaturated polyester resin composition according to claim 1, wherein said liquid thermoplastic resin is a liquid resin prepared in a manner so that 30 to 45% by weight of at least one resin selected from the group consisting of acrylic-based resin, vinyl acetate-based resin, saturated polyester resin and thermoplastic urethane resin and having a glass transition point of not higher than 150° C. is dissolved in 55 to 70% by weight of polymerizable unsaturated monomer.

4. The unsaturated polyester resin composition according to claim 1, wherein said polymerizable unsaturated monomer is a styrene-based monomer.

5. The unsaturated polyester resin composition according to claim 1, wherein said glass fiber has a fiber size of from 6 to 18 μm and a fiber length of from 1 to 20 mm.

6. A cured unsaturated polyester resin obtained by curing of an unsaturated polyester resin composition defined in claim 1, wherein: said cured unsaturated polyester resin has a 60°-angular gloss of not lower than 88% and a glass transition point of not lower than 180° C.; and a weight loss of said cured unsaturated polyester resin on heating is not larger than 1.5% when said cured unsaturated polyester resin is heated at 200° C. for 200 hours.

7. A cured unsaturated polyester resin obtained by curing of an unsaturated polyester resin composition defined in claim 1, wherein said cured unsaturated polyester resin has a tensile strength of not smaller than 20 MPa, a bending strength of not smaller than 40 MPa and an Izod impact strength of not smaller than 40 J/m.

8. A lamp reflecting mirror base made of a cured unsaturated polyester resin obtained by curing of an unsaturated polyester resin composition defined in claim 1.

9. The unsaturated polyester composition according to claim 1, wherein said inorganic filler is calcium carbonate having a mean particle size of from 0.2 to 20 μm.

* * * * *